United States Patent
Di Palma et al.

(10) Patent No.: US 9,296,074 B2
(45) Date of Patent: Mar. 29, 2016

(54) ARRANGEMENT WITH A METAL PIPE AND A CONNECTING ELEMENT, AS WELL AS METHOD OF MOUNTING THE CONNECTING ELEMENT

(75) Inventors: Michele Di Palma, Springe (DE); Stephan Lange, Wedemark (DE); Klaus Schippl, Hannover (DE); Ing Christian Frohne, Hannover (DE)

(73) Assignee: NEXANS, Paris (FR)

( * ) Notice: Subject to any disclaimer, the term of this patent is extended or adjusted under 35 U.S.C. 154(b) by 362 days.

(21) Appl. No.: 13/405,448

(22) Filed: Feb. 27, 2012

(65) Prior Publication Data

US 2012/0256413 A1 Oct. 11, 2012

(30) Foreign Application Priority Data

Apr. 11, 2011 (EP) .................................. 11305422

(51) Int. Cl.
*F16L 25/00* (2006.01)
*B23P 19/04* (2006.01)
*F16L 33/26* (2006.01)
*H01P 1/04* (2006.01)

(52) U.S. Cl.
CPC .............. *B23P 19/04* (2013.01); *F16L 25/0036* (2013.01); *F16L 33/26* (2013.01); *H01P 1/042* (2013.01); *Y10T 29/49826* (2015.01)

(58) Field of Classification Search
CPC ......... F16L 25/0036; F16L 9/06; F16L 11/15; F16L 51/02; F16L 33/26
USPC .......................... 285/288.1, 288.2, 294.1, 903
See application file for complete search history.

(56) References Cited

U.S. PATENT DOCUMENTS

| 3,757,280 | A |   | 9/1973 | Staschewski |
| 5,137,470 | A | * | 8/1992 | Doles ............................ 439/578 |
| 7,328,920 | B2 | * | 2/2008 | Schneider et al. ............ 285/256 |

* cited by examiner

*Primary Examiner* — David E Bochna
*Assistant Examiner* — James Linford
(74) *Attorney, Agent, or Firm* — Sofer & Haroun, LLP

(57) ABSTRACT

An arrangement is provided for a helically corrugated pipe made of metal, which has an end face extending along a turn of the thread of its corrugation and a connecting element to be fastened to the pipe. The connecting element includes a pipe piece which has a helically extending inner surface corresponding to the turn of the thread of the corrugation of the pipe. The pipe piece is mounted on the pipe in the corrugation of the pipe. A metal ring is arranged on the pipe piece, where the pipe piece has sections with different inner diameters arranged one behind the other in the axial direction.

3 Claims, 2 Drawing Sheets

US 9,296,074 B2

ARRANGEMENT WITH A METAL PIPE AND A CONNECTING ELEMENT, AS WELL AS METHOD OF MOUNTING THE CONNECTING ELEMENT

RELATED APPLICATION

This application claims the benefit of priority from European Patent Application No. 11 305 422.5, filed on Apr. 11, 2011, the entirety of which is incorporated by reference.

BACKGROUND

1. Field of the Invention

The invention relates to an arrangement with a helically corrugated pipe of metal which has an end face extending along a turn of the thread of its corrugation, and a connecting element to he fastened to the corrugation, wherein the connecting piece includes a pipe piece of metal, which has a helically extending inner surface corresponding to the thread of the corrugation of the pipe, and a smooth cylindrical outer surface and, in the mounted position, is arranged on the pipe, with engagement into the corrugation of the pipe, as well as a method for mounting the connecting element (DE-C-21 26 871).

2. Description of the Related Art

Pipes of metal which are corrugated transversely of their longitudinal direction have been known for a long time. They are used, for example, as electrical conductors of high frequency cables, as sheathings for electrical and optical cables, in cryostats for superconductive cables, or for transporting liquid or gaseous media. Because of the wave shaped configuration of the wail of the pipe, special connections are required for the further connection of the pipe. In pipes having ring-shaped corrugations, such connections are still of relatively simple construction. It is more difficult in pipes having helically-shaped corrugations because, in a radial section through such a pipe, additionally an end face is created which is located eccentrically relative to the center axis of the pipe, and which may not be round.

In the known connecting element, according to the above mentioned DE-C-21 26 871, a holding ring is screwed onto the end of a helically corrugated pipe, wherein the holding ring has a helically-shaped inner surface and a cylindrical outer surface. The holding ring rests in the mounted position against a radially outwardly bent beaded edge which extends along a turn of the thread.

For this purpose, the holding ring has an end face corresponding to the course of the beaded edge and extending along a turn of the thread. In the mounted position a sleeve-like fitting is placed on the holding ring, wherein the fitting has in its interior a contact surface corresponding to the course of the beaded edge, and which, in the mounted position, rests against the beaded edge. This connecting element is in its totality cumbersome and not suitable for a stable connection of further structural components.

OBJECTS AND SUMMARY

The invention is based on the object of constructing the above-described connecting element, such that it can be mounted with a stable fixed seat on a helically corrugated pipe.

In accordance with the invention, this object is met in that in the mounted position, a metal ring is arranged on the pipe piece while contacting the pipe piece, and is welded with the pipe piece whose inner surface includes two sections with different inner diameters arranged axially one behind the other, the ring rests with its section having the greater inner diameter on the pipe piece, and rests with its section having the smaller inner diameter, on the pipe on the side of the pipe piece facing the end face of the pipe, the section of the ring having the smaller inner diameter has an end face corresponding to the course of the turn of the thread of the pipe and extending along a helical line, the ring is at its helically extending end face welded to the end face of the pipe.

In accordance with the invention, for example, the following method steps are carried out:

a) After one revolution the pipe is severed at one end along a turn of the thread, with a section in the axial direction connecting the beginning and the end of the turn of the thread;

b) Screwed onto the pipe is a pipe piece of metal, which has a helically extending inner surface and a smooth cylindrical outer surface;

c) A metal ring, having two sections with inner diameters, is slid onto the pipe piece with its section having the greater diameter which rests with its section having the smaller diameter on the pipe, and which has, in this section, an end face corresponding to the turn of the thread of the pipe and extending along a helical line;

d) The ring is welded to the end face of the pipe at its helically extending end face;

e) The ring is welded to the pipe piece.

The pipe piece and the ring of this connecting element are located outside of the corrugated pipe so that its inner cross section is not restricted by the two parts. Since the ring is welded to the corrugated pipe, as well as to the pipe piece, a mechanically stable connecting element which is fixedly connected to the connecting element is obtained. When the pipe piece, after welding the ring to the pipe, is rotated or pushed with the pipe in the direction of the end of the corrugated pipe, the side of the thread is pressed at its inner surface against the wall of the corresponding corrugation of the pipe. When the ring and the pipe piece are then welded together, the fixed seat of ring and pipe piece on the pipe is further improved.

BRIEF DESCRIPTION OF THE DRAWINGS

An embodiment of the subject matter of the invention is illustrated in the drawings.

In the drawing.

DETAILED DESCRIPTION

Figure 1:
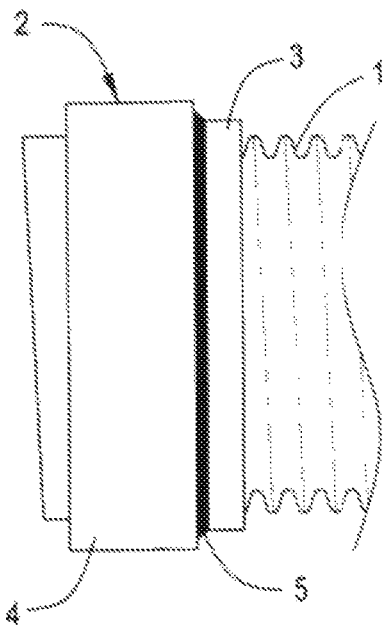
FIG. 1 shows in a schematic illustration a connecting element according to the invention mounted at an end of a helically corrugated metal pipe.
Figure 2:
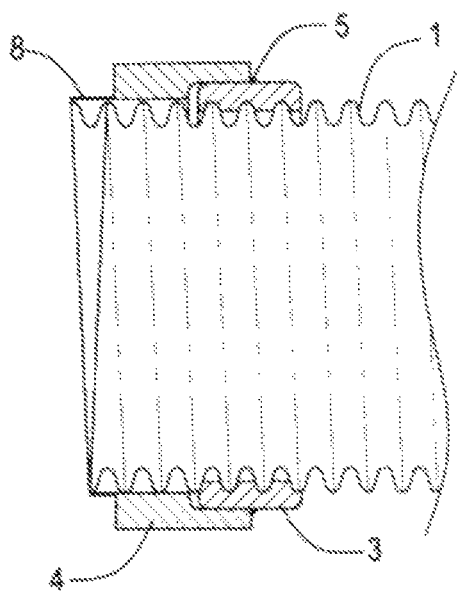
FIG. 2 is a cross sectional view through FIG. 1.

FIG. 1 shows the end of a pipe 1 which is provided with an undulation which extends transversely of its axis along a helical line. The pipe 1 advantageously is of steel, particularly high-grade steel, or of copper. A connecting element 2 is fastened to the pipe 1, wherein the connecting element 2 serves for connecting further components.

The connecting element 2 is also of metal, particularly high-grade steel. It has a pipe piece 3 provided with an inner thread and a smooth cylindrical outer surface, and a ring 4. In the assembled position, pipe piece 3 and ring 4 are circumferentially welded together at location 5. The inner thread of the pipe piece 3 corresponds to the helically shaped course of the undulation of the pipe 1. The ring 4 is stepped in its interior. As a result, in accordance with the illustrations in FIG. 4, a section 6 with a greater inner diameter and a section 7 with a smaller inner diameter are formed. The inner diameter of the section 6 corresponds to the outer diameter of the pipe piece 3, while the inner diameter of the section 7 corresponds to the outer diameter of the pipe 1.

The ring 4 advantageously has at its end, on the side of section 7, a projection 8 with a wall thickness which is significantly smaller as compared to its other dimensions, but with the same inner diameter as the section 7. The end face of the projection 8 extends congruent with the end face of the pipe 1 along a helical line. In the assembled position, pipe 1 and ring 4 are welded together at their end faces by means of: a circumferential welding seam 9.

Figure 3:
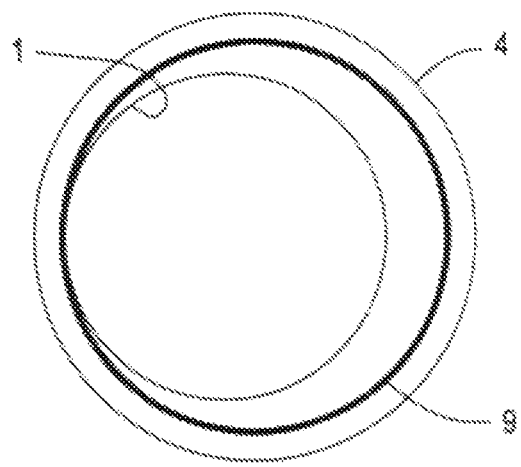
FIG. 3 shows a top view of the end face of the connecting element.

For mounting the connecting element 2 on a corrugated pipe 1, initially the pipe piece 3 is screwed onto the pipe 1 up to a predetermined position. Subsequently, the ring 4 is slid onto the pipe 1 and the pipe piece 3, to such an extent that the end face of its projection 8 is in alignment with the end face of the pipe 1. Pipe 1 and ring 4 are then welded together at their end faces along the seam 9 (FIG. 3). The pipe piece 3 is then turned back or pushed back in the direction of the end of pipe 1 as needed, until it rests against the step formed in the ring as a result of the stepped configuration of the ring 4. As a result, the side of the thread at the inner side of the pipe piece 3 is also pressed against the wall of the corresponding corrugation of the pipe 1. Finally, ring 4 and pipe piece 3 are welded together at location 5.

Figure 4:
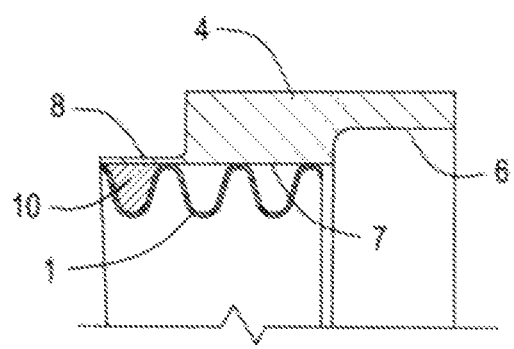
FIG. 4 shows a detail of the connecting element on a larger scale.

Due to the axially extending cut made when producing the end face, the wave valley adjacent the helically extending end face of the pipe 1 is open. For sealing the pipe 1 relative to its surroundings, a filling body 10 can advantageously be placed in this wave valley as shown in FIG. 4, and can be fixedly connected to the pipe 1 and the ring 4, for example, welded together. This closes the opening between pipe 1 and ring 4. In FIG. 4, only the ring 4 and a section of the pipe 1 are shown on a larger scale. The filling body 10 extends preferably about approximately 360°. It may be constructed as a prefabricated fitted piece of high-grade steel which only has to be placed in the wave valley.

The invention claimed is:

1. Arrangement for a helically undulated pipe of metal and connection element, said arrangement comprising:
    a helically corrugated metal pipe which has an end face extending along a helical turn of the thread of its undulation; and
    a connection element fastened to the pipe, said connection element includes only two pieces, the first of which being a metal pipe piece which has a helically extending inner surface corresponding to the helical thread of the corrugation of the pipe, and a smooth cylindrical outer surface, said metal pipe piece of said connection element is arranged on the pipe by engaging in the corrugation of the pipe in a mounted position, wherein
    in said mounted position, said connection element also has a second piece that is a metal ring that is arranged over the pipe piece, in contact with and welded to the pipe piece, wherein the inner surface of the ring has a first section with a first larger inner diameter and a second section with a second smaller inner diameter, said first and second sections being arranged axially one behind the other,
    said first section with a first larger inner diameter of the ring rests on the smooth cylindrical outer surface of said pipe piece, and said second section with a second smaller inner diameter of said ring rests on the helically corrugated metal pipe said second section being proximate to the end face of the pipe,
    wherein the second section of the ring with the smaller inner diameter has an end face extending along a helical line corresponding to the course of the turn of the thread of the pipe,
    wherein the ring is welded at its helically extending end face to the end face of the pipe.

2. Arrangement according to claim 1, wherein the ring has, in the area of its section having the smaller inner diameter, an axially extending projection with thin walls in relation to its other wall thicknesses, wherein the course of the projection corresponds to the course of the end face of the pipe.

3. Arrangement according to claim 1, wherein a filling body is mounted in a wave valley of the pipe adjacent the end face of the pipe.

* * * * *

UNITED STATES PATENT AND TRADEMARK OFFICE
CERTIFICATE OF CORRECTION

Page 1 of 1

PATENT NO. : 9,296,074 B2
APPLICATION NO. : 13/405448
DATED : March 29, 2016
INVENTOR(S) : Di Palma et al.

It is certified that error appears in the above-identified patent and that said Letters Patent is hereby corrected as shown below:

Claims

Column 4, Claim 1, Line 2: The word "undulated" between the words "helically" and "pipe" should read as "corrugated"

Column 4, Claim 1, Line 4: The word "undulation" between the words "it's" and "and" should read as "corrugation"

Signed and Sealed this
Seventeenth Day of May, 2016

Michelle K. Lee
*Director of the United States Patent and Trademark Office*